United States Patent

Martinson et al.

[11] Patent Number: 6,104,723
[45] Date of Patent: *Aug. 15, 2000

[54] NETWORK FOR PACKET-ORIENTED DATA TRAFFIC

[75] Inventors: Thomas Martinson; Fabrice Bonvin, both of Fribourg; Daniel Gachet, Bosingen; Francois Volery, Villars-sur-Giâne; Andreas Danuser, Ittigen, all of Switzerland

[73] Assignee: Ascom Tech AG, Bern, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,367

[22] Filed: Oct. 27, 1997

[30] Foreign Application Priority Data

Oct. 29, 1996 [CH] Switzerland ............................. 2666/96

[51] Int. Cl.[7] ......................... H04L 12/403; H04L 12/66
[52] U.S. Cl. ........................................... 370/452; 370/463
[58] Field of Search ................................... 370/249, 258, 370/403, 404, 406, 424, 452, 903, 907, 909, 395, 375, 376, 222, 232, 450, 460, 434, 463; 359/118, 119

[56] References Cited

U.S. PATENT DOCUMENTS

| | | |
|---|---|---|
| 5,103,447 | 4/1992 | Takiyasu et al. ................... 370/460 |
| 5,121,384 | 6/1992 | Ozeki et al. ....................... 370/400 |
| 5,140,587 | 8/1992 | Mueller et al. .................... 370/460 |
| 5,313,454 | 5/1994 | Bustini et al. ..................... 370/232 |
| 5,339,317 | 8/1994 | Tanaka et al. ..................... 370/460 |
| 5,394,389 | 2/1995 | Kremer .............................. 370/405 |
| 5,418,785 | 5/1995 | Olshansky et al. ................ 370/438 |
| 5,521,928 | 5/1996 | Worsley et al. ................... 370/375 |
| 5,526,356 | 6/1996 | Kim et al. .......................... 370/403 |
| 5,602,841 | 2/1997 | Lebizay et al. .................... 370/413 |
| 5,710,777 | 1/1998 | Gawne ............................... 370/222 |
| 5,717,796 | 2/1998 | Clendening ........................ 370/222 |
| 5,793,746 | 8/1998 | Gerstel et al. ..................... 370/258 |
| 5,848,068 | 12/1998 | Daniel et al. ...................... 370/395 |

*Primary Examiner*—Chau Nguyen
*Assistant Examiner*—Chiho Andrew Lee

[57] ABSTRACT

Several nodes are connected to a ring structure by means of communication lines in a network for packet-oriented data traffic. Each node is connected to lines of the ring structure. A buffer circuit is provided between the high speed interfaces for reading a routing information on the head of a data packet. The buffer circuits are structured in such a manner that the delay time in the transit traffic is smaller than, for example, 10 $\mu$s. Several users are connected at the node. A wait line circuit is provided for each user. A controller ensures the processing of the data packets in the transit, insert and extract modes.

18 Claims, 2 Drawing Sheets

NETWORK FOR PACKET-ORIENTED DATA TRAFFIC

BACKGROUND OF THE INVENTION

1. Field of the Invention

The invention concerns a network for packet-oriented data traffic wherein several nodes are connected by means of lines. The invention also concerns a node for such a network and a process for operating the same.

2. Description of the Background Art

The connection-oriented traffic of data with high data rate is gaining increasing importance. So-called ATM networks (ATM=Asynchronous Transfer Mode), for example, are currently being developed for local data traffic.

An ATM network is known from U.S. Pat. No. 5,475,682, wherein each node has a transfer function (switch). That is, the ATM cells that meet at a node of the network line are divided according to their corresponding destination into different output wait lines of respective network lines and then transmitted. The problem consists in that single or multiple nodes are overloaded when a high demand is placed on the network. In the known systems, therefore, it is provided that such overload situations are signalized to the nodes lying upstream by means of so-called backpressure signals. The data packets determined for the signalizing node are stored in a wait line in the upstream-lying node. If the wait line is full, then the data packets are still transferred to the node lying downstream. There, in the case of an overload, the packets with the longest bursts are pushed out of the memory and are lost. In this process, it should be avoided that a node can block all of the advancing ones.

The basic challenge with this known network structure is presented by the need to provide a minimum packet delay. For real-time applications, namely, it is unavoidable that the transfer takes place within an individually set time. It can also be important to determine within which variation the pregiven time limit can be kept. In the known networks, the transfer time (namely, if a greater amount of nodes must be traversed during the transfer of data) is relatively high and can also vary greatly.

SUMMARY OF THE INVENTION

The object of the invention is to provide a network of the kind described above, which makes possible high transmission rates and low packet delay times.

The object of the invention is attained, in accordance with a preferred embodiment, wherein each node has at least two high-speed interfaces corresponding to the respective network connections (electric or optical lines, wireless communications connections, etc.). These interfaces are connected by means of a buffer circuit, where a data packet (for example, an ATM cell) remains for as long as it takes for a controller to read the target address information (routing information) contained in the head of the cell. Several subscribers can be connected to the node. They are operated by means of user interfaces, which typically have a much lower processing speed than the high-speed interfaces. The node has wait lines for the data traffic with the users, which store intermediately the data packets to be fed (inserted) into the network and to be outputted (extracted) therefrom. The controller controls the transit, input (inserted), and output (extracted) traffic.

The main idea of the invention consists in that the transit traffic can be held on the ring lines at the highest possible speed level. In contrast with the state of the art, in the invention, the transit traffic in the node is not passed by means of the wait lines. The cells are passed along as fast as possible; that is, the delay time is selected at such a slow rate that the controller has just enough time to read that part of the head that allows a decision as to whether the arriving cell is to be outputted or refed into the transit traffic in the network line. The data traffic present in the ring line can, in principle, circulate freely; the insert traffic, if at all, has to wait.

Instead, the data insert and extract are carried out completely by means of wait lines. These serve to control the traffic on the ring line in such a manner that no overload or blockage is possible. In other words, the data is fed into the ring line if the required bandwidth is available or if free capacities are present from the initial point or start node to the stop point or stop node.

The network preferably has a pure ring structure. This provides a considerable simplification of the structure and, therefore, a higher transit speed. Branching and crossovers are, however, not completely excluded. The invention is, therefore, suitable for ATM networks.

The buffer circuit provided in the nodes should enable a transit time that is as short as possible. They are preferably shaped in such a manner that the total delay time brought on by one single node is considerably smaller than 10 $\mu$s, particularly smaller than 5 $\mu$s. A minimizing of the delay per node is important due to the following reason: the amount of nodes traveled in the transit traffic depends upon from what start node to what target node a data packet is sent. If now the transit delay per node is not negligibly small with respect to the time needed for inserting and extracting traffic in the start and target nodes, it becomes difficult, if not impossible to provide a transfer service with an acceptable CDV dimension (CDV=cell delay variation). How small the delay time in each single case is or should be depends naturally also upon the data rate on the ring line.

Several buffers can be operated in a multiplex arrangement for providing sufficient time for reading the relevant routing information from each individual cell. That is, the high-speed interface at the input side of the node distributes the arriving ATM cells systematically into several arranged buffers (demultiplexing). Each buffer circuit can intermediately store an ATM cell. The head (header) of the buffered cells are read by the controller. A cell that has reached its target node is extracted. The ATM cells can be passed by the user wait lines into the provided buffer and fed into the ring line (multiplexing) as soon as the transit traffic has sufficient space (bandwidth). The high-speed interface at the output side of the node systematically puts the cells that are ready in the buffers on the ring lines (multiplexing).

A bypass function can be provided for avoiding an interruption in the ring line in the case of a blackout. This bypass function becomes active if, for example, a blackout (or another function disturbance) occurs. A switch, for example, which bridges or fades out the bypass line when there is current can be provided for this purpose. If the current fails, then the switch changes over into a rest position, wherein the bypass line can be operated.

Due to safety reasons, it is advantageous if the ring connection is doubled. Both ring connections are preferably used continuously, but the flow directions are different. If a connection between two neighboring nodes is interrupted, then the transit traffic in that node is coupled by means of a so-called "loopback" from one ring connection into the other. In this way, a ring traffic is again established (with a simple instead of a doubled transfer capacity, however). It is naturally also possible to operate one of the two ring connections on reserve ("hot standby"). That is, no payload data but only control or system cells are transmitted.

The ring lines can be established wireless or by wire. They are preferably fiberglass. A separate fiberglass connection is provided for each ring line (or direction). However, it is also possible to make available different channels within one fiber (for example, by using different wave lengths or polarization modes). A physical connection can also make available several logic channels or communication connections. The named channels or connections can be operated all in the same direction or also in different directions.

If the transmission interruption causes a loopback, the available bandwidth is reserved for the ATM-cells with the highest priority. In other words: the available bandwidth is used according to the priorities of the ATM cells. The cells with the lowest priority are the first to be lost. In this connection, it must be established that basically each ATM cell is characterized with a priority. By providing priority classes, it is also made possible to support different transfer services (for example, services with set pregiven bandwidths, services with variable bandwidths, etc.).

The node is preferably structured in such a way that the direct communication between the local connected users is also possible (subscriber/subscriber communication). Therefore, for the individual user, the total ring structure appears as a closed switch unit that can connect each one user with any other user. The user must, therefore, not have to worry about to what node of the network the searched receiver is connected.

The controller adds a cell from one user wait line into a buffer only if the required bandwidth is free or reserved. Services of higher priority receive, for example, the firmly set requested bandwidth. Services with unspecified bandwidths are only then carried out, if the transfer capacity is freely avail ab le.

Further advantageous embodiments and feature combinations result from the following detailed description and all of the patent claims.

BRIEF DESCRIPTION OF THE DRAWINGS

The drawings are used for further illustrating the embodiments of the invention and are given by way of illustration only and thus are not limitative, wherein.

Basically, identical parts are referred to with the same reference numbers in the figures.

DETAILED DESCRIPTION OF THE PREFERRED EMBODIMENTS

Figure 1:
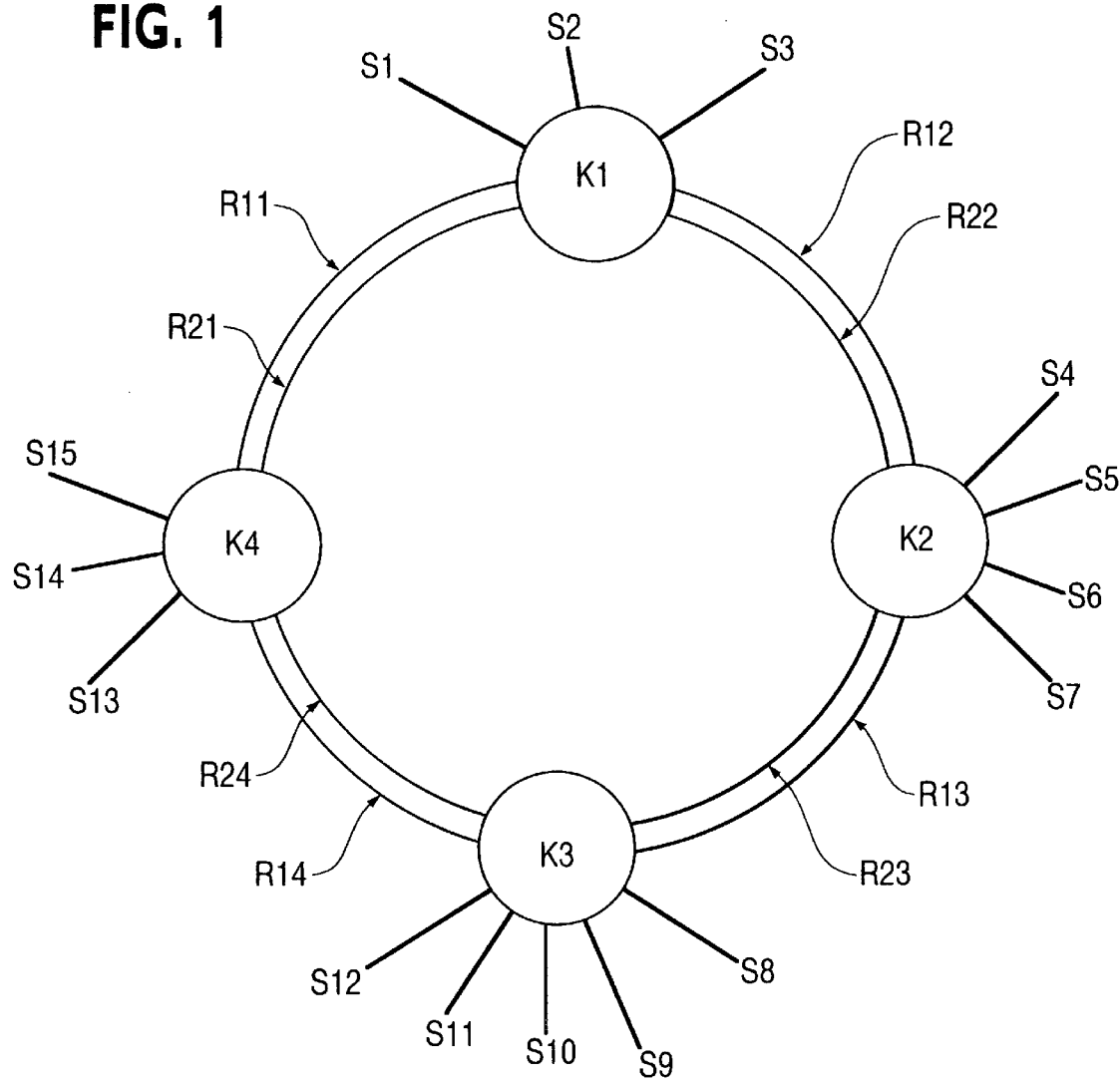
FIG. 1 is a schematic representation of the network of the ring structure.

FIG. 1 shows a schematic of the ATM network with the ring structure. An amount of users S1–S15 is connected by means of a network. Several different services can be taken up for communication (for example, services for the real time data transfer or for file transfer).

The control of the ATM network is preferably structured in such a manner that the users S1–S15 have the impression that they are all connected by means of a same single switching central. For this purpose, for example, a central is provided, which assigns the required bandwidths and controls the establishment and breakup of the connection. (The central is not represented in the figures. It can be carried out as a separate physical unit or by means of distributed function blocks.)

It is a fact that the users S1–S15 are distributed over a larger area and are connected each to the nearest node K1–K4. The nodes K1–K4 are connected by means of lines R11–R14 in such a manner that a doubled ring line is generated. According to a preferred embodiment, both ring lines (R11–R24) are used for communications (R21–R14) run, for example, one in clockwise direction and the other one, for example, in counterclockwise direction.

All nodes K1–K4 have, in principle, the same function. This will be briefly explained in the following. If the user S15, for example, wants to transfer data to the user S4, he notifies this by means of his node K4. The node K4 will ensure (for example, with the aid of a central function), that the necessary bandwidth, for example, is made available on the ring section R11–R12 (or on the lines R24–R23). The data transfer can take place thereafter. The user S15, for example, can communicate with the user S14 in the same manner, whereby he does not have to worry if the user S14 is connected to the same node or not.

If a node fails, then a local bypass line comes into action, so that the remaining part of the network is still operational.

Furthermore, in the case of a defect of the line, a loopback function is implemented in the nodes K1–K4. If, for example, the line R13 is interrupted, then, on the one hand, the transit traffic in the node K2 goes from the line R12 to the line R22 (instead of to the line R13). In this same sense, the transit traffic in the node K3 goes from the line R24 to the line R14. In this manner, viewed topologically, a new ring structure (namely R12-R22-R21-R24-R14-R1-R12) is achieved. However, this ring structure is a single line structure and therefore offers only the simple transfer capacity for the original structure. According to the invention, the available bandwidths are reserved for the transfer services with the highest priority until the damage is repaired. The remaining ones must expect a loss in data. In this way, it is expected that each communication or connection can be provided with a priority numeral in the normal operation, so that in case of failures the line R13 as mentioned in the example the data traffic can be redimensioned with respect to the corresponding priorities.

Figure 2:
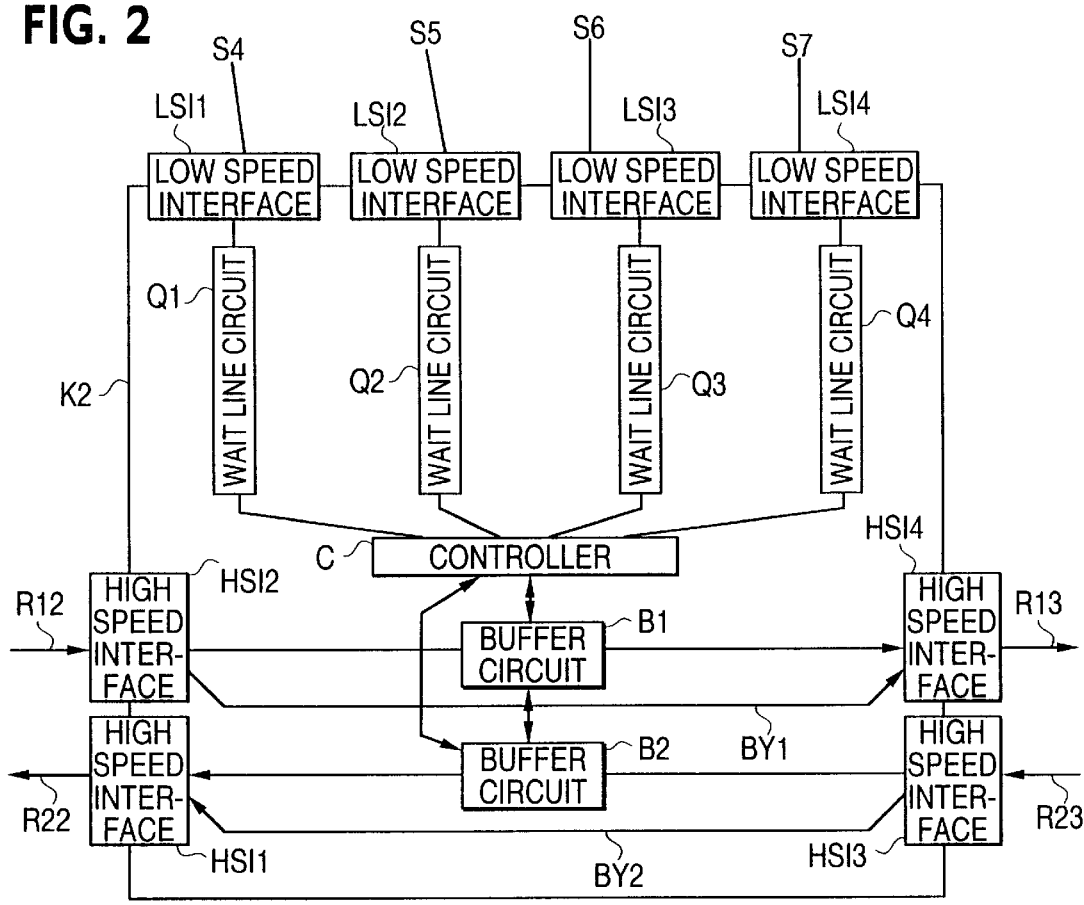
FIG. 2 is a schematic representation of a node.

FIG. 2 shows a circuit block diagram of the node K2 (which at the same time represents all the other nodes). In the present example, this node has four so-called low-speed interfaces LSI1–LSI4 for the users S4–S7 (compare with FIG. 1). Four so-called high-speed interfaces HSI1–HSI4 are also provided for the lines R22, R12, R23, or R13. The high-speed interfaces HSI1–HSI4 work with very high data rates (for example, in the range of several GHz or higher), while the low-speed interfaces LSI1–LSI4, for example, work in the sub-GHz range. The processing speed of the high-speed interfaces may well be by a factor of 2–10 times greater than that of the low-speed interfaces. According to a particularly preferred embodiment, the lines R11–R14, R21–R24 are glass fiber cables. The high-speed interfaces HSI1–HSI4 are therefore presented as optoelectronic switches. (As a rule, the low-speed interfaces are structured for the electronic signalization. There is nothing that impedes the use of optic components.) A buffer circuit B1 or B2 is provided between each one of the high-speed interfaces HSI2 and HSI4 or HSI1 and HSI3. These buffer circiuts store the incoming ATM cells just until the controller C can decide if the ATM cell is assigned to the present node or not. The goal is to keep the delay time of an ATM cell as short as possible. The total delay time lies preferably within the range of a few microseconds (for example, at 5 μs).

Both buffer circiuts B1, B2 are bridged by means of passive bypass lines BY1, BY2. In the normal operation, the ATM cells are fed into the buffer circuits B1, B2; in the case of a blackout (or another function disturbance), instead, redirecting switches in the high-speed interfaces HSI1–HSI4 fall by themselves into a position wherein the ATM cells are passed directly by means of the bypass lines BY1, BY2 from the inflow to the outflow (pure transit traffic). The named redirecting switches can be, for example, electronically controllable, micromechanic redirecting mirrors that are pre-tensed during normal operation.

If the controller C determines that an ATM cell located in the buffer circuit B1 or B2 is assigned to a locally connected user S2–S4, then it is extracted and then inputted into the corresponding wait line circuit Q1–Q4. The ATM cells can be passed from there to the user by means of the corresponding low-speed interface LSI1–LSI4.

The ATM cells that come from the user are stored intermediately by the controller C via the buffer circuit B1 or B2 in the corresponding wait line Q1–Q4 before they are fed to the ring line R13 or R22.

Each wait line circuit comprises, in the practice, several wait lines. Several wait lines are also provided for the inserted extarct of ATM cells since transfer services of different quality and priority can be supported according to the preferred embodiment.

The controller C can also support the local user-to-user traffic. That is, the corresponding data are fed from the wait line of the first user directly into the corresponding wait line of the second user. The ring line is naturally not loaded by this local data exchange.

The previously mentioned loopback can be assigned by the central processor, for example. It can be carried out by the controller. That is, the transit traffic is, for example, given by the high-speed interface HSI2 (via buffer circuit B1) directly to the high-speed interface HSI1.

Figure 3:
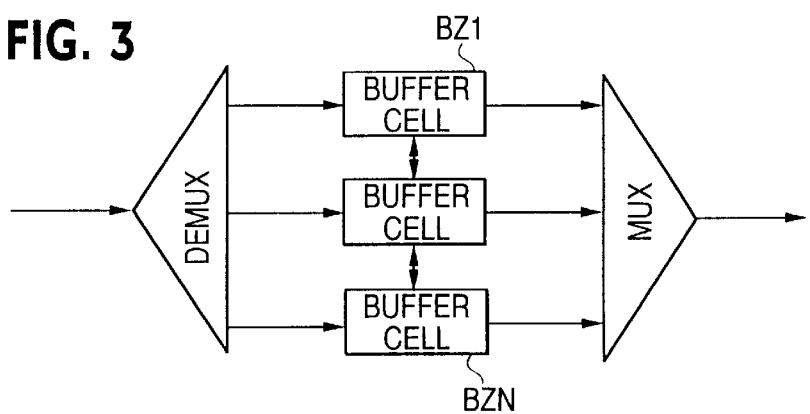
FIG. 3 is a schematic representation of a demultiplexing/multiplexing arrangement.

FIG. 3 shows a block circuit diagram of a buffer circuit B1 or B2. At the inflow side, the ATM cells are distributed by means of a demultiplexer DEMUX onto a plurality of buffer cells BZ1–BZN. The outputs of the buffer cells BZ1–BZN are switched onto a multiplexer MUX.

The parallel in processing reached in this manner leads to an increase of the processing speed. At the same time, the delay time can be minimized. The ATM cells must not work their way through FIFO wait lines, but are processed immediately. In the same sense, the minimum delay time is limited to the absolute minimum.

The buffer circuit can, for example, be a delay line where an optical reader that reads the routing information on the head of the ATM cell is installed in inflow and where an optical switch is arranged at the output which either passes the ATM cell to the high-speed interface on the output side or into the wait line circuit of the respective user.

The invention is naturally not limited to the circuit examples shown in the drawings. The possibility of providing more than two transit paths is also excluded out. A certain node could even have access to two different ring structures. All structures that require wait lines in the transit traffic should be avoided.

In summary, it is to be established that a structure for packet-oriented data exchange is obtained by means of the invention and is suitable for the highest transmission services and speeds. The principle of the invention can also be implemented with purely optical switching elements in the transit range.

What is claimed is:

1. A network for packet-oriented data traffic, wherein several nodes are connected by communication lines to form a ring network, each node comprising:
   a least one user interface with a wait line for data packets which are inserted into or extracted from the ring network;
   high speed interfaces establishing connections between the communication lines of the ring network and the node, said high speed interfaces having a higher processing speed than said at least one user interface;
   a controller for processing data packets in transit, insert and extract modes; and
   a buffer circuit, coupled between said high speed interfaces, for enabling said controller to read a routing information in a head of a data packet, said buffer circuit operating at such a rate that delay time of the data packets in the transit mode correspond to a read cycle of said controller for reading the routing information.

2. The network according to claim 1, wherein said buffer circuit is structured in such a manner that the delay time in the transit mode amounts to less than 10 μs.

3. The network according to claim 1, wherein said buffer circuit has several buffer cells organized in a multiplex arrangement.

4. The network according to claim 1, wherein each node further comprises at least one bypass line which maintains transit data traffic during a service interruption in the node.

5. The network according to claim 1, wherein the communication lines are structured as double ring lines and the data traffic passes through both ring lines in opposite circulation directions.

6. The network according to claim 5, wherein several communication lines are installed in a fiberoptic line, said high speed interfaces being structured in such a manner that the communication lines can all be operated in a same direction or different directions.

7. The network according to claim 5, wherein a loopback function is implemented in each node which ensures a continuation of ring traffic in remaining communication lines in the case of a defect in a communication line.

8. The network according to claim 7, wherein each node further comprises a controller structured in such a manner that the data packets are operated in the activated loopback function in correspondence to priority in transit and input data traffic.

9. The network according to claim 8, wherein said controller supports a local data exchange between two users of the same node.

10. The network according to claim 1, wherein the communication lines and the nodes are structured for a purely optical or optoelectric data transfer.

11. A process for operating a network according to claim 1, wherein a data packet is fed by a user into a wait line and is then fed into a communication line only when a corresponding bandwidth or capacity for transit on the communication line is available.

12. The process according to claim 11, wherein the communication lines are operated during normal operation with opposing circulation directions and, in the case of a connection interruption, only data packets of high priority are transferred into a loopback via a communication line that remains active.

13. The network according to claim 2, wherein the delay time is approximately 5 µs or less.

14. A node for a packet-oriented data traffic network comprising:

high-speed interfaces coupled to communication lines of the packet-oriented data traffic network;

a buffer circuit for reading a routing information in a head of a data packet, said buffer circuit being provided between said high-speed interfaces;

at least one user interface with a wait line circuit; and a controller for processing data packets in transit, insert or output modes, a data packet remaining in said buffer circuit during the transit mode for a delay time that corresponds to a read cycle of said controller for reading routing information from the packet.

15. The node according to claim 14, wherein said buffer circuit has several buffer cells organized in a multiplex arrangement.

16. A network for packet-oriented data traffic, wherein several nodes are connected by communication lines to form a ring network, each node comprising:

a least one user interface with a wait line for data packets which are inserted into or extracted from the ring network;

high speed interfaces establishing connections between the communication lines of the ring network and the node, said high speed interfaces having a higher processing speed than said at least one user interface;

a controller for processing data packets in transit, insert and extract modes; and a buffer circuit, coupled between said high speed interfaces, for enabling said controller to read a routing information in a head of a data packet, said buffer circuit operating at such a rate that delay time of the data packets in the transit mode is fixed and at least as long as a read cycle of said controller for reading the routing information.

17. The network of claim 16, wherein a processing speed of said high speed interfaces is at least two times greater than a processing speed of said at least one user interface.

18. A network for packet-oriented data traffic, wherein several nodes are connected by communication lines to form a ring network, each node comprising:

a least one user interface with a wait line for data packets which are inserted into or extracted from the ring network;

high speed interfaces establishing connections between the communication lines of the ring network and the node, said high speed interfaces having a higher processing speed than said at least one user interface;

a controller for processing data packets in transit, insert and extract modes; and a buffer circuit, coupled between said high speed interfaces, for enabling said controller to read a routing information in a head of a data packet, a data packet being delayed in said buffer circuit during the transit mode for a delay time that is at least as long as a read cycle of said controller for reading the routing information and shorter than a time needed for inserting or extracting a data packet at a node during the insert and extract modes.

* * * * *